(12) United States Patent
Stewart et al.

(10) Patent No.: US 11,788,216 B2
(45) Date of Patent: *Oct. 17, 2023

(54) SINGLE-LAYER CERAMIC-BASED KNIT FABRIC FOR HIGH TEMPERATURE BULB SEALS

(71) Applicant: THE BOEING COMPANY, Chicago, IL (US)

(72) Inventors: Tiffany A. Stewart, Sherman Oaks, CA (US); Christopher P. Henry, Thousand Oaks, CA (US); Amoret M Chappell, St. Charles, MO (US)

(73) Assignee: The Boeing Company, Arlington, VA (US)

( * ) Notice: Subject to any disclaimer, the term of this patent is extended or adjusted under 35 U.S.C. 154(b) by 243 days.

This patent is subject to a terminal disclaimer.

(21) Appl. No.: 17/175,983

(22) Filed: Feb. 15, 2021

(65) Prior Publication Data
US 2021/0164134 A1 Jun. 3, 2021

Related U.S. Application Data

(62) Division of application No. 14/741,138, filed on Jun. 16, 2015, now Pat. No. 11,053,614.

(51) Int. Cl.
*D04B 1/14* (2006.01)
*F16J 15/08* (2006.01)
(Continued)

(52) U.S. Cl.
CPC .............. *D04B 1/14* (2013.01); *D04B 1/225* (2013.01); *F16J 15/027* (2013.01); *F16J 15/065* (2013.01);
(Continued)

(58) Field of Classification Search
CPC .......... D04B 1/14; D04B 1/224; D04B 1/225; D04B 21/14; D10B 2505/06;
(Continued)

(56) References Cited

U.S. PATENT DOCUMENTS 1,976,885 A   10/1934 Levin
2,112,769 A   3/1938 James
(Continued)

FOREIGN PATENT DOCUMENTS

DE          3622781 A1    1/1988
DE    102012214328 A1    2/2014
(Continued)

OTHER PUBLICATIONS

Extended European Search Report for European Application No. 16169436.9 dated Oct. 19, 2016.
(Continued)

*Primary Examiner* — Jocelyn Bravo
(74) *Attorney, Agent, or Firm* — Patterson + Sheridan, LLP

(57) ABSTRACT

Knit fabrics having ceramic strands, thermal protective members formed therefrom and to their methods of construction are disclosed. Methods for fabricating thermal protection using multiple materials which may be concurrently knit are also disclosed. This unique capability to knit high temperature ceramic fibers concurrently with a load-relieving process aid, such as an inorganic or organic material (e.g., metal alloy or polymer), both small diameter wires within the knit as well as large diameter wires which provide structural support and allow for the creation of near net-shape preforms at production level speed. Additionally, ceramic insulation can also be integrated concurrently to provide increased thermal protection.

20 Claims, 9 Drawing Sheets

(51) Int. Cl.
| | |
|---|---|
| *F16J 15/02* | (2006.01) |
| *F16J 15/22* | (2006.01) |
| *F16J 15/06* | (2006.01) |
| *D04B 1/22* | (2006.01) |

(52) U.S. Cl.
CPC .......... *F16J 15/0812* (2013.01); *F16J 15/22* (2013.01); *D10B 2101/08* (2013.01); *D10B 2505/06* (2013.01)

(58) Field of Classification Search
CPC .. D10B 2101/108; F16J 15/027; F16J 15/065; F16J 15/0812; F16J 15/22
See application file for complete search history.

(56) References Cited

U.S. PATENT DOCUMENTS

| | | | |
|---|---|---|---|
| 3,964,277 A | | 6/1976 | Miles |
| 3,999,930 A | * | 12/1976 | Telbizoff ............ B29D 99/0053 |
| | | | 264/320 |
| 4,036,037 A | | 7/1977 | Huckfeldt |
| 4,244,197 A | | 1/1981 | Althammer |
| 4,375,779 A | | 3/1983 | Fischer |
| 4,468,043 A | | 8/1984 | Brazel |
| 4,470,251 A | * | 9/1984 | Bettcher ............... D02G 3/442 |
| | | | 57/902 |
| 4,750,324 A | * | 6/1988 | Tochacek ................ D02G 3/32 |
| | | | 428/366 |
| 4,776,160 A | | 10/1988 | Rees |
| 4,838,017 A | * | 6/1989 | Kolmes ................. D02G 3/442 |
| | | | 57/902 |
| 5,014,917 A | | 5/1991 | Sirocky et al. |
| 5,070,540 A | | 12/1991 | Bettcher et al. |
| 5,299,435 A | | 4/1994 | Whalley |
| 5,438,852 A | | 8/1995 | Ford |
| 5,617,900 A | * | 4/1997 | Weil ........................ F16L 59/00 |
| | | | 138/110 |
| 5,632,137 A | * | 5/1997 | Kolmes .................... D02G 3/12 |
| | | | 57/212 |
| 5,806,295 A | * | 9/1998 | Robins ..................... D02G 3/38 |
| | | | 57/220 |
| 5,910,094 A | | 6/1999 | Kraft et al. |
| 5,965,223 A | | 10/1999 | Andrews et al. |
| 6,015,618 A | | 1/2000 | Orima |
| 6,089,052 A | * | 7/2000 | Riegger .................... D04B 1/16 |
| | | | 66/196 |
| 6,151,922 A | | 11/2000 | Shimasaki |
| 6,363,703 B1 | | 4/2002 | Kolmes |
| 6,381,940 B1 | | 5/2002 | Kolmes et al. |
| RE38,136 E | | 6/2003 | Kolmes |
| 6,800,367 B2 | * | 10/2004 | Hanyon ................. D02G 3/443 |
| | | | 428/394 |
| 6,966,590 B1 | | 11/2005 | Ksiezopolki et al. |
| 6,984,596 B2 | | 1/2006 | Dickerson |
| 7,028,740 B2 | | 4/2006 | Clarady et al. |
| 7,111,445 B2 | * | 9/2006 | Threlkeld .............. D02G 3/443 |
| | | | 57/229 |
| 7,219,899 B2 | | 5/2007 | Kesseg |
| 7,341,613 B2 | | 3/2008 | Kirsch |
| 7,419,202 B1 | | 9/2008 | Hanser et al. |
| 7,637,549 B2 | | 12/2009 | Hess |
| 8,283,563 B2 | * | 10/2012 | Harris .................. D03D 1/0041 |
| | | | 174/117 M |
| 8,327,905 B2 | | 12/2012 | McDonald et al. |
| 8,366,168 B1 | | 2/2013 | Ksiezopolski et al. |
| 8,434,333 B2 | | 5/2013 | Zhang et al. |
| 8,505,339 B2 | | 8/2013 | Malloy et al. |
| 8,733,762 B2 | | 5/2014 | Barnes |
| 2002/0079655 A1 | | 6/2002 | Aksit et al. |
| 2004/0091705 A1 | * | 5/2004 | Hanyon ................. D02G 3/442 |
| | | | 428/373 |
| 2005/0193592 A1 | * | 9/2005 | Dua ......................... A43D 8/00 |
| | | | 36/45 |
| 2006/0013990 A1 | | 1/2006 | Brentrup et al. |
| 2009/0050226 A1 | * | 2/2009 | Mirmand ................. F16L 11/02 |
| | | | 138/123 |
| 2010/0084179 A1 | * | 4/2010 | Harris .................. D03D 1/0043 |
| | | | 174/126.1 |
| 2010/0186455 A1 | * | 7/2010 | Zhu ......................... D02G 3/185 |
| | | | 2/168 |
| 2010/0266831 A1 | * | 10/2010 | Durie ..................... B29C 70/885 |
| | | | 428/221 |
| 2011/0162126 A1 | * | 7/2011 | Zhang ....................... D04B 1/22 |
| | | | 66/215 |
| 2011/0224703 A1 | | 9/2011 | Mortarino |
| 2012/0234051 A1 | * | 9/2012 | Huffa ....................... D04B 7/04 |
| | | | 66/126 R |
| 2012/0234052 A1 | * | 9/2012 | Huffa .................... A43B 23/042 |
| | | | 66/126 R |
| 2013/0274858 A1 | | 10/2013 | Bar et al. |
| 2014/0237861 A1 | * | 8/2014 | Podhajny ............... D04B 15/56 |
| | | | 66/170 |
| 2015/0075228 A1 | | 3/2015 | De Keyzer et al. |
| 2016/0369436 A1 | | 12/2016 | Stewart et al. |

FOREIGN PATENT DOCUMENTS

| | | |
|---|---|---|
| EP | 0384613 A1 | 8/1990 |
| EP | 0794367 A2 | 9/1997 |
| EP | 1274959 A1 | 1/2003 |
| EP | 3106556 A1 | 12/2016 |
| JP | S63182434 A | 7/1988 |
| JP | H0319959 A | 1/1991 |
| JP | 2012510028 A | 4/2012 |
| JP | 2014040345 A | 3/2014 |
| WO | 9401373 A1 | 1/1994 |
| WO | 01079756 A1 | 10/2001 |

OTHER PUBLICATIONS

Extended European Search Report for Application No. 172101347.1018 dated Jun. 11, 2018.
Canadian Office Action for Application No. 2,926,393 dated Oct. 25, 2018.
Japanese Office Action for Application No. 2016-115178 dated Oct. 29, 2019.

* cited by examiner

SINGLE-LAYER CERAMIC-BASED KNIT FABRIC FOR HIGH TEMPERATURE BULB SEALS

RELATED APPLICATION

This application is a divisional of co-pending U.S. patent application Ser. No. 14/741,138, filed Jun. 16, 2015. The aforementioned related patent application is herein incorporated by reference in their entirety.

FIELD

The implementations described herein generally relate to knit fabrics and more particularly to single-layer knit fabrics having ceramic strands knit concurrently with metal wire, thermal sealing members formed therefrom and to their methods of construction.

BACKGROUND

In many high-temperature applications, such as aircraft structures, thermal sealing members are often utilized between opposing faces or parts. These opposing parts may be opened and closed repeatedly during operation or maintenance procedures. Typically, the thermal sealing member provides a thermal barrier that will withstand particular conditions, for example, an exposure to temperatures in excess of 1,000 degrees Celsius for in excess of 15 minutes.

Current techniques for manufacturing thermal sealing members include the use of multilayer materials including, for example, stainless steel spring tube, multiple layers of woven ceramic fabric, and an outer stainless steel mesh that must be integrated by hand. Beyond the fabrication challenges, stiffness of the stainless steel spring tube is relatively low, which can lead to wrinkling, deformations, and subsequently degraded performance at critical regions. In addition, the current thermal sealing members typically known as "bulb seals," are repeatedly compressed in normal use, and do not restore to their proper shape and maintain the seal. Furthermore, current thermal sealing members often have marginal thermal resistance and burn out in an excessively short time. The capability of being compressed many thousands of times while still providing a good thermal barrier is thus difficult to achieve.

Therefore there is a need for improved lightweight, low cost and higher temperature capable thermal sealing members that permit higher operational temperatures while minimizing compression set under thermal loads and methods of manufacturing the same.

SUMMARY

The implementations described herein generally relate to knit fabrics and more particularly to single-layer knit fabrics having ceramic strands knit concurrently with metal wire, thermal sealing members formed therefrom and to their methods of construction. According to one implementation, a thermal sealing member is provided. The thermal sealing member comprises a single-layer ceramic-based knit fabric and a first metal alloy wire. The single-layer ceramic-based knit fabric comprises a continuous ceramic strand and a continuous load-relieving process aid strand. The continuous ceramic strand serves the continuous load-relieving process aid strand. The continuous load-relieving process aid strand and the first metal alloy wire are concurrently knit to form the single-layer ceramic-based knit fabric. The continuous load-relieving process aid strand may be a polymeric material. The continuous load-relieving process aid strand may be a metallic material. The continuous ceramic strand may be a multifilament material and the continuous load-relieving process aid strand may be a monofilament material.

In some implementations, the thermal sealing member further comprises a second metal alloy wire inlayed into the ceramic-based knit fabric. The second metal alloy wire may be interwoven into the ceramic-based knit fabric. A diameter of the second metal alloy wire may be greater than a diameter of the first metal alloy wire. The second metal alloy wire may be shaped such that there is uniform spacing, non-uniform spacing, or both uniform and non-uniform spacing between segments of the second metal alloy wire to achieve a tailored stiffness. The tailored stiffness is specific to the application with respect to both geometry and operational loads. In some implementations, the second metal alloy wire is aligned parallel with a knit direction of the single-layer ceramic-based knit fabric. In some implementations, the second metal alloy wire is angled relative to a knit direction of the single-layer ceramic-based knit fabric. In some implementations, multiple metal alloy wires are inlayed in the ceramic-based knit fabric. In some implementations, the multiple metal alloy wire inlays include at least one inlay aligned with the knit direction and at least one inlay angled relative to the knit direction. The metal wire alloys may be designed, aligned or both such that at least one of the cross-overs or intersections of the inlaid metal alloy wires occur away from contact or abrasive surfaces in order to mitigate seal wear.

In some implementations, the metal alloy wires may be designed, aligned or both such that at least one of the cross-overs or intersections of the inlaid metal alloy wires occur outside of the knit fabric away from contact or abrasive surfaces in order to mitigate seal wear.

In some implementations, the single-layer ceramic-based knit fabric is constructed using a flat-knitting process or a tubular-knitting process. The single-layer ceramic-based knit fabric may be a weft-knitted fabric. The single-layer ceramic-based knit fabric may be a warp-knitted fabric.

In some implementations, the thermal sealing member further comprises insulation material positioned in an interior of the thermal sealing member. The insulation material may be stitched to the single-layer ceramic-based knit fabric.

In some implementations, the thermal sealing member is selected from an M-shaped double-blade bulb seal, an omega-shaped bulb seal, and a p-shaped bulb seal.

In some implementations, the thermal sealing member is made from shaping the single-layer ceramic-based knit fabric into an M-shaped double-blade bulb seal, an omega-shaped bulb seal, or a p-shaped bulb seal.

In some implementations, the thermal sealing member has a reversible elastic deflection of at least 10% to at most 80% of a height of the thermal sealing member.

In yet another implementation, a method of forming a thermal sealing member is provided. The method comprises simultaneously feeding a continuous ceramic strand and a continuous load-relieving process aid strand through a single material feeder and a first metal alloy wire through a second material feeder. The ceramic strand, the continuous load-relieving process aid strand and the first metal alloy wire are concurrently knit or "plated" together to form a single-layer ceramic-based knit fabric. The metal alloy wire may be in a soft-tempered state. The single-layer ceramic-based knit fabric is formed into the shape of the thermal sealing member. The metal alloy wire may be heat hardened after the final seal shape is achieved. The method may further comprise wrapping the continuous ceramic strand around the continuous process aid strand prior to simultaneously feeding the continuous ceramic strand and the continuous load-relieving process aid strand into the knitting machine. The method may further comprise heating the knit fabric to a first temperature to remove the load-relieving process aid. The method may further comprise heating the knit fabric to a second temperature greater than the first temperature to anneal the ceramic strand. The method may further comprise removing the continuous load-relieving process aid strand from the knit fabric. The load-relieving process aid may be removed by exposure to a solvent, heat or light to remove the process aid.

In some implementations, the method further comprises interweaving a second metal alloy wire into the ceramic-based knit fabric. The diameter of the second metal alloy wire may be greater than a diameter of the first metal alloy wire. The second metal alloy wire may be aligned parallel with a knit direction of the single-layer ceramic-based knit fabric. The second metal alloy wire may be angled relative to a knit direction of the single-layer ceramic-based knit fabric.

In some implementations, the method further comprises adding insulation material to an interior of the shaped thermal sealing member. The insulation material may be stitched to the single-layer ceramic-based knit fabric. The single-layer ceramic-based knit fabric may be stitched together to form the thermal sealing member.

In some implementations, concurrent knitting is performed using either a flat-knitting process or a tubular-knitting process. The single-layer ceramic-based knit fabric may be formed using a weft-knitting process. The single-layer ceramic-based knit fabric may be formed using a warp-knitting process. The method may further comprise heat-treating the formed thermal sealing member to remove the load-relieving process aid. The method may further comprise heat-treating the formed thermal sealing member to harden the first metal alloy wire.

The features, functions, and advantages that have been discussed can be achieved independently in various implementations or may be combined in yet other implementations, further details of which can be seen with reference to the following description and drawings.

BRIEF DESCRIPTION OF ILLUSTRATIONS

So that the manner in which the above-recited features of the present disclosure can be understood in detail, a more particular description of the disclosure briefly summarized above may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

To facilitate understanding, identical reference numerals have been used, wherever possible, to designate identical elements that are common to the figures. Additionally, elements of one implementation may be advantageously adapted for utilization in other implementations described herein.

DETAILED DESCRIPTION

Figure 1:
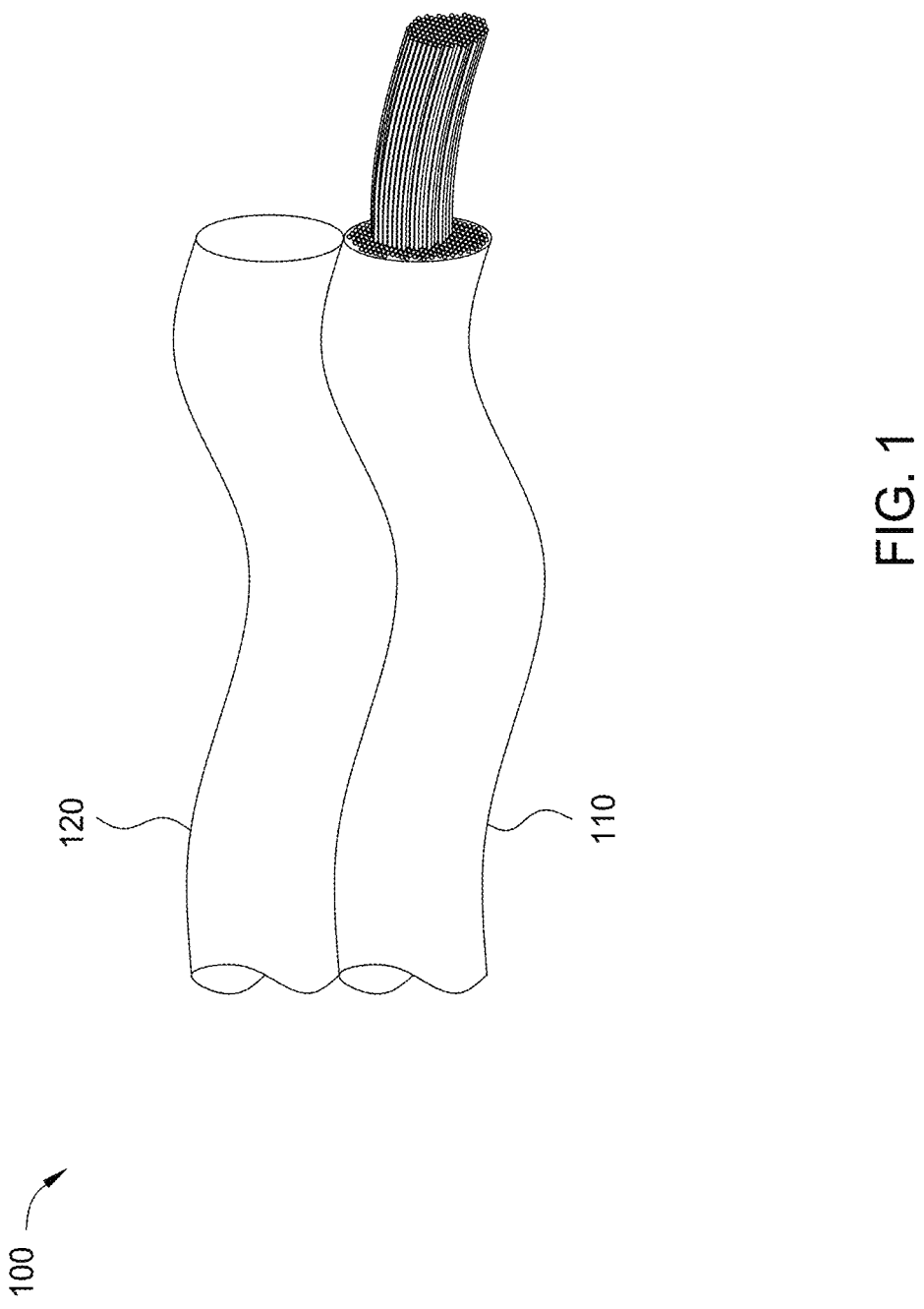
FIG. 1 is an enlarged partial perspective view of a multicomponent stranded yarn including a continuous ceramic strand and a continuous load-relieving process aid strand prior to processing according to implementations described herein.

The following disclosure describes knit fabrics and more particularly describes single-layer knit fabrics having ceramic strands knit concurrently with metal wire, thermal sealing members formed therefrom and to their methods of construction. Certain details are set forth in the following description and in FIGS. 1-11 to provide a thorough understanding of various implementations of the disclosure. Other details describing well-known structures and systems often associated with knit fabric types and architectures and forming knit fabrics are not set forth in the following disclosure to avoid unnecessarily obscuring the description of the various implementations.

Many of the details, dimensions, angles and other features shown in the Figures are merely illustrative of particular implementations. Accordingly, other implementations can have other details, materials, components, dimensions, angles and features without departing from the spirit or scope of the present disclosure. In addition, further implementations of the disclosure can be practiced without several of the details described below.

Prior to the implementations described herein, it was not feasible to produce products having complex geometries or near net-shape components by knitting multiple materials into a single-layer at production level speeds. Current techniques for producing high temperature seals include multi-layer solutions having stainless steel spring tube, multiple layers of woven ceramic and an outer stainless steel mesh that must be integrated by hand. Beyond the fabrication challenges, the stainless steel spring tube stiffness is relatively low, which can lead to wrinkling, deformations, and subsequently to degraded performance at critical regions of the formed component. Thus, current fabrication techniques fail to address the fundamental issues of producing lighter weight, efficient, and low cost thermal barrier seals that permit higher operation temperatures while minimizing compression set under thermal loads. The unique capability to knit high temperature ceramic fibers concurrently with metal alloy wire, both small diameter wire within the knit fabric as well as large diameter wire which provides structural support, creates complex near net-shape preforms at production-level speed with improved compression set at thermal loads.

Some implementations described herein relate to methods for fabricating thermal protection using multiple materials which may be concurrently knit with commercially available knitting machines. This unique capability to knit high temperature ceramic fibers concurrently with a load-relieving process aid, such as an inorganic or organic material (e.g., metal alloy or polymer), both small diameter wire (e.g., from about 50 micrometers to about 300 micrometers; from about 100 micrometers to about 200 micrometers) within the knit as well as large diameter wire (e.g., from about 300 micrometers to about 1,000 micrometers; from about 400 micrometers to about 700 micrometers). The load-relieving process aid provides structural support and de-tensions the ceramic fiber as the ceramic fiber is exposed to the stresses of the small radius curvature present in commercial knitting machines. Thus, the creation of near net-shape performs comprising ceramic fibers at production level speed can be achieved. Additionally, ceramic insulation can also be integrated concurrently to provide increased thermal protection. Not to be bound by theory, it is believed that the large diameter wire enhances the bending stiffness and the small diameter wire contributes to the abrasion resistance of the co-knit fabric. Both the large diameter wire and the small diameter wire are sized appropriately for their function. The diameter of the small diameter wire is typically selected such that it does not interfere with the bending stiffness enhancement provided by the large diameter wire. In some implementations, there is at least a 50% difference (e.g., between 50% and 70% difference; between 55% and 65% difference) between the diameter of the small wire and the diameter of the large wire.

In addition, some implementations described herein also include a fabrication process for knit thermal protection materials using a commercially available knitting machine. Unlike previous work, some implementations described herein include multiple materials being concurrently knit in a single-layer. The materials and knit parameters may be varied in order to produce a tailorable part for a specific application. Some implementations described herein generally differ from previous techniques by providing at least one of the following advantages: enables higher operating temperature engines; reduces certification effort and time; and reduces process fabrication and maintenance costs.

In some implementations described herein, multiple materials (e.g., ceramic fibers and alloy wires) are concurrently knit in a single knit layer. Concurrently knitting in a single-layer may save weight, fabrication and assembly labor for registration of layers. In some implementations, the knit surrounds an inlaid larger diameter wire, which serves to resist an applied mechanical force.

The implementations described herein are potentially useful across a broad range of products, including many industrial products and aero-based owner products (sub-sonic, supersonic and space), which would significantly benefit from lighter-weight, low cost, and higher temperature capable shaped components. These components include but are not limited to a variety of soft goods such as, for example, thermally resistant seals, gaskets, expansion joints, blankets, wiring insulation, tubing/ductwork, piping sleeves, firewalls, insulation for thrust reversers, engine struts and composite fan cowls. These components also include but are not limited to hard goods such as exhaust and engine coverings, liners, shields and tiles.

In some implementations, the thermal sealing member has a reversible elastic deflection of at least 10% to at most 80% of a height of the thermal sealing member (e.g., at least 20% to at most 70%; at least 30% to at most 60%). Not to be bound by theory, it is believed that the reversible elastic deflection of the thermal sealing member is directly related to the elastic strength/strain limits of the bending material. Further, in implementations where Inconel® alloy 718 is used, it is believed that heat treatment of the Inconel® alloy 718 increases the strength to enable large elastic deflections.

The methods for fabricating knit thermal protection described herein may be performed using commercially-available knitting machines. In some implementations, a sacrificial monofilament may be used as a knit processing aid to prevent breakage of the ceramic fiber. The sacrificial monofilament may be removed after the component is knit. Additionally, in some implementations, a metal alloy component may be "plated" with the ceramic yarn into the desired knit fabric.

The materials described herein can also be knit into net-shapes and fabrics containing spatially differentiated zones, both simple and complex, directly off the machine through conventional bind off and other apparel knitting techniques. Exemplary net-shapes include simple box-shaped components, complex curvature variable diameter tubular shapes, and geometric tubular shapes.

The term "filament" as used herein refers to a fiber that comes in continuous or near continuous length. The term "filament" is meant to include monofilaments and/or multi-filament, with specific reference being given to the type of filament, as necessary.

The term "flexible" as used herein means having a sufficient pliability to withstand small radius bends, or small loop formation without fracturing, as exemplified by not having the ability to be used in stitch bonding or knitting machines without substantial breakage.

The term "heat fugitive" as used herein means volatizes, burns or decomposes upon heating.

The term "knit direction" as used herein is vertical during warp-knitting and horizontal during weft-knitting.

The term "strand" as used herein means a plurality of aligned, aggregated fibers or filaments.

The term "yarn" as used herein refers to a continuous strand or a plurality of strands spun from a group of natural or synthetic fibers, filaments or other materials, which can be twisted, untwisted or laid together.

Referring in more detail to the drawings, FIG. 1 is an enlarged partial perspective view of a multicomponent stranded yarn 100 including a continuous ceramic strand 110 and a continuous load-relieving process aid strand 120 prior to processing according to implementations described herein. The continuous load-relieving process aid strand 120 is typically under tension during the knitting process while reducing the amount of tension that the continuous ceramic strand is subjected to during the knitting process. As depicted in FIG. 1, the multicomponent stranded yarn 100 is a bi-component stranded yarn.

The continuous ceramic strand 110 may be a high temperature resistant ceramic strand. The continuous ceramic strand 110 is typically resistant to temperatures greater than 500 degrees Celsius (e.g., greater than 1,200 degrees Celsius). The continuous ceramic strand 110 typically comprises multi-filament inorganic fibers. The continuous ceramic strand 110 may comprise individual ceramic filaments whose diameter is about 15 micrometers or less (e.g., 12 micrometers or less; a range from about 1 micron to about 12 micrometers) and with the yarn having a denier in the range of about 50 to 2,400 (e.g., a range from about 200 to about 1,800; a range from about 400 to about 1,000). The continuous ceramic strand 110 can be sufficiently brittle but not break in a small radius bend of less than 0.07 inches (0.18 cm). In some implementations, a continuous carbon-fiber strand may be used in place of the continuous ceramic strand 110.

Exemplary inorganic fibers include inorganic fibers such as fused silica fiber (e.g., Astroquartz® continuous fused silica fibers) or non-vitreous fibers such as graphite fiber, silicon carbide fiber (e.g., Nicalon™ ceramic fiber available from Nippon Carbon Co., Ltd. of Japan) or fibers of ceramic metal oxide(s) (which can be combined with non-metal oxides, e.g., $SiO_2$) such as thoria-silica-metal (III) oxide fibers, zirconia-silica fibers, alumina-silica fibers, alumina-chromia-metal (IV) oxide fiber, titania fibers, and alumina-boria-silica fibers (e.g., 3M™ Nextel™ 312 continuous ceramic oxide fibers). These inorganic fibers may be used for high temperature applications. In implementations where the continuous ceramic strand 110 comprises alumina-boria-silica yarns, the alumina-boria-silica may comprise individual ceramic filaments whose diameter is about 8 micrometers or less with the yarn having a denier in the range of about 200 to 1,200.

The continuous load-relieving process aid strand 120 may be a monofilament or multi-filament strand. The continuous load-relieving process aid strand 120 may comprise organic (e.g., polymeric), inorganic materials (e.g., metal or metal alloy) or combinations thereof. In some implementations, the continuous load-relieving process aid strand 120 is flexible. In some implementations, the continuous load-relieving process aid strand 120 has a high tensile strength and a high modulus of elasticity. In implementations where the continuous load-relieving process aid strand 120 is a monofilament, the continuous load-relieving process aid strand 120 may have a diameter from about 100 micrometers to about 625 micrometers (e.g., from about 150 micrometers to about 250 micrometers; from about 175 micrometers to about 225 micrometers). In implementations where the continuous load-relieving process aid strand 120 is a multifilament, the individual filaments of the multifilament may each have a diameter from about 10 micrometers to about 50 micrometers (e.g., from about 20 micrometers to about 40 micrometers).

Depending on the application, the continuous load-relieving process aid strand 120, whether multifilament or monofilament, can be formed from, by way of example and without limitation, from polyester, polyamide (e.g., Nylon 6,6), polyvinyl acetate, polyvinyl alcohol, polypropylene, polyethylene, acrylic, cotton, rayon, and fire retardant (FR) versions of all the aforementioned materials when extremely high temperature ratings are not required. If higher temperature ratings are desired along with FR capabilities, then the continuous load-relieving process aid strand 120 could be constructed from, by way of example and without limitation, materials including meta-Aramid fibers (sold under names Nomex®, Conex®, for example), para-Aramid (sold under the tradenames Kevlar®, Twaron®, for example), polyetherimide (PEI) (sold under the tradename Ultem®, for example), polyphenylene sulfide (PPS), liquid crystal thermoset (LCT) resins, polytetrafluoroethylene (PTFE), and polyether ether ketone (PEEK). When even higher temperature ratings are desired along with FR capabilities, the continuous load-relieving process aid strand 120 can include mineral yarns such as fiberglass, basalt, silica and ceramic, for example. Aromatic polyamide yarns and polyester yarns are illustrative yarns that can be used as the continuous load-relieving process aid strand 120.

In some implementations, the continuous load-relieving process aid strand 120, when made of organic fibers, may be heat fugitive, i.e., the organic fibers are volatized or burned away when the knit article is exposed to a high temperatures (e.g., 300 degrees Celsius or higher; 500 degrees Celsius or higher). In some implementations, the continuous load-relieving process aid strand 120, when made of organic fibers, may be chemical fugitive, i.e., the organic fibers are dissolved or decomposed when the knit article is exposed to a chemical treatment.

In some implementations, the continuous load-relieving process aid strand 120 is a metal or metal alloy. In some implementations for corrosion resistant applications, the continuous load-relieving process aid strand 120 may comprise continuous strands of nickel-chromium based alloys, such as alloys comprising more than 12% by weight of chromium and more than 40% by weight of nickel (e.g., Inconel® alloys, Inconel® alloy 718), nickel-chromium-molybdenum based alloys, such as alloys comprising at least 10% by weight of molybdenum and more than 20% by weight of chromium (e.g., Hastelloy), aluminum, stainless steel, such as a low carbon stainless steel, for example, SS316L, which has high corrosion resistance properties. Other conductive continuous strands of metal wire may be used, such as, for example, copper, tin or nickel plated copper, and other metal alloys. These conductive continuous strands may be used in conductive applications. In implementations where the continuous load-relieving process aid strand 120 is a multifilament, the individual filaments of the multifilament may each have a diameter from about 50 micrometers to about 300 micrometers (e.g., from about 100 micrometers to about 200 micrometers).

The continuous load-relieving process aid strand 120 and the continuous ceramic strand 110 may both be drawn into a knitting system through a single material feeder together or "plated" in the knitting system through two material feeders to create the desired knit fabric with the continuous load-relieving process aid strand 120 substantially exposed on one face of the fabric and the continuous ceramic strand 110 substantially exposed on the opposing face of the fabric.

Figure 2:
FIG. 2 is an enlarged partial perspective view of a multicomponent stranded yarn including a continuous ceramic strand wrapped around a continuous load-relieving process aid strand according to implementations described herein.

FIG. 2 is an enlarged partial perspective view of a multicomponent stranded yarn 200 including the continuous ceramic strand 110 served (wrapped) around the continuous load-relieving process aid strand 120 according to implementations described herein. The continuous load-relieving process aid strand 120 is typically under tension during the knitting process while reducing the amount of tension that the continuous ceramic strand 110 is subjected to during the knitting process. This reduction in tension typically leads to reduced breakage of the continuous ceramic strand 110.

The continuous ceramic strand 110 is typically wrapped around the continuous load-relieving process aid strand 120 prior to being drawn into the knitting system. The continuous ceramic strand 110 wrapped around the continuous load-relieving process aid strand 120 may be drawn into the knitting system through a single material feeder to create the desired knit fabric.

A serving process may be used to apply the continuous ceramic strand 110 to the continuous load-relieving process aid strand 120. Any device, which provides covering to the continuous load-relieving process aid strand 120, as by wrapping or braiding the continuous ceramic strand 110 around the continuous load-relieving process aid strand 120, such as a braiding machine or a serving/overwrapping machine, may be used. The continuous ceramic strand 110 can be wrapped on the continuous load-relieving process aid strand 120 in a number of different ways, i.e. the continuous ceramic strand 110 can be wrapped around the continuous load-relieving process aid strand 120 in both directions (double-served), or it can be wrapped around the continuous load-relieving process aid strand 120 in one direction only (single-served). In addition, the number of wraps per unit of length can be varied. For example, in one implementation, 0.3 to 3 wraps per inch (e.g., 0.1 to 1 wraps per cm) are used.

Figure 3:
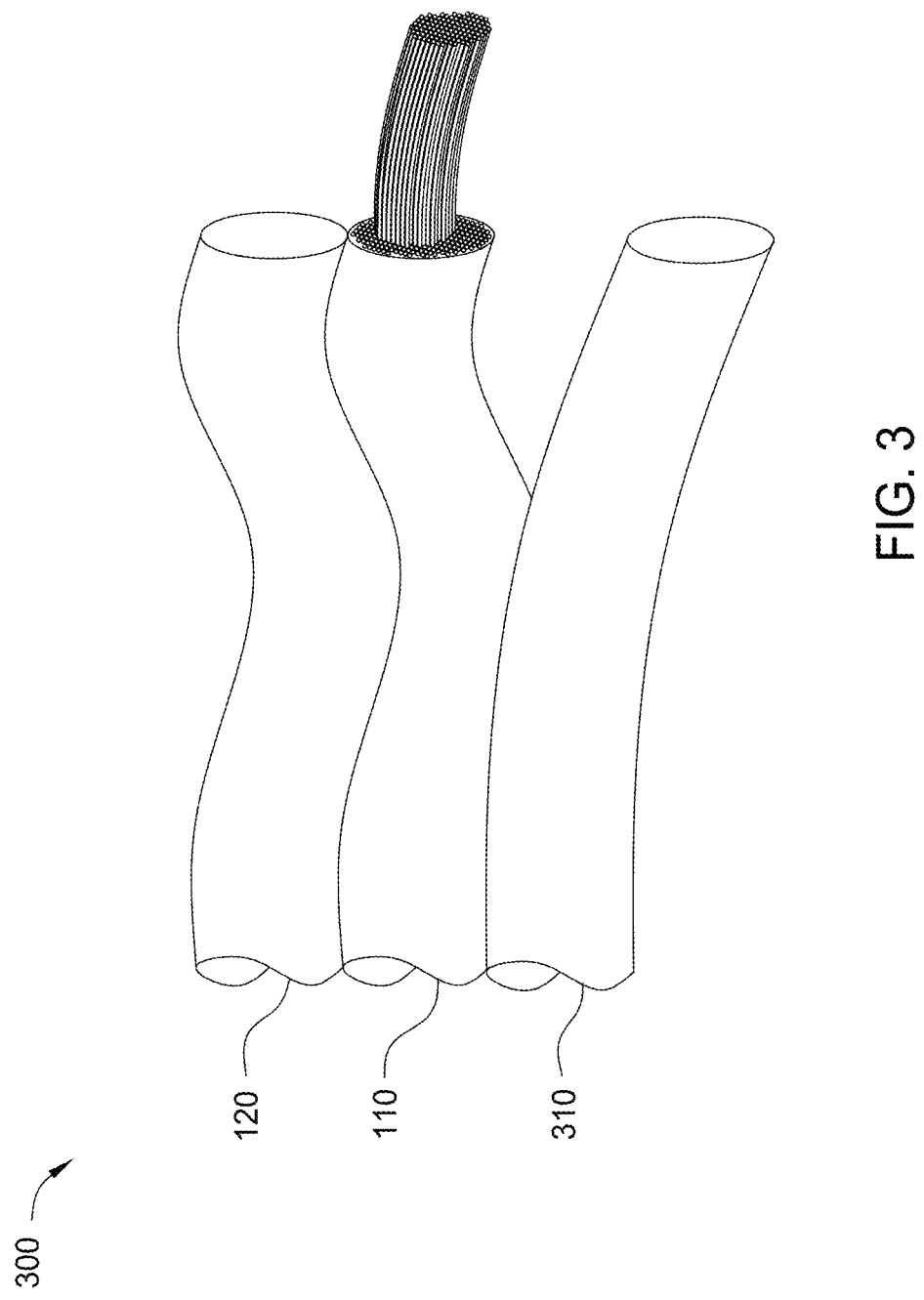
FIG. 3 is an enlarged partial perspective view of a multicomponent stranded yarn including a continuous ceramic strand, a continuous load-relieving process aid strand and a metal alloy wire prior to processing according to implementations described herein.

FIG. 3 is an enlarged partial perspective view of a multicomponent stranded yarn 300 including the continuous ceramic strand 110, the continuous load-relieving process aid strand 120 and a metal wire 310 prior to processing according to implementations described herein. As depicted in FIG. 3, the multicomponent stranded yarn 300 is a tri-component stranded yarn. The metal wire 310 provides additional support to the continuous ceramic strand 110 during the knitting process. The continuous load-relieving process aid strand 120 may be a polymeric monofilament as described herein. The continuous load-relieving process aid strand 120 and the continuous ceramic strand 110 may be both drawn into the knitting system through a single material feeder and "plated" together with the metal wire 310, which is drawn into the system through a second material feeder to create the desired knit fabric.

Similar to the previously described metal alloy materials of the continuous load-relieving process aid 120, the metal wire 310 may comprise continuous strands of nickel-chromium based alloys (e.g., Inconel® alloys, Inconel® alloy 718), nickel-chromium-molybdenum based alloys, aluminum, stainless steel, such as a low carbon stainless steel, for example, SS316L, which has high corrosion resistance properties. However, other conductive continuous strands of metal wire could be used, such as, copper, tin or nickel plated copper, and other metal alloys, for example.

In implementations where the continuous load-relieving process aid strand 120 is heat fugitive (e.g., removed via a heat cleaning process), the metal wire 310 is typically selected such that it will withstand the heat cleaning process. In implementations where the metal wire 310 is a monofilament, the process aid strand may have a diameter from about 100 micrometers to about 625 micrometers (e.g., from about 150 micrometers to about 250 micrometers). In implementations where the metal wire 310 is a multifilament, the individual filaments of the multifilament may each have a diameter from about 10 micrometers to about 50 micrometers. In some implementations, the metal wire 310 is knit into the knit fabric in a soft-tempered state and later heat hardened after the desired shape of the final product is achieved.

Figure 4:
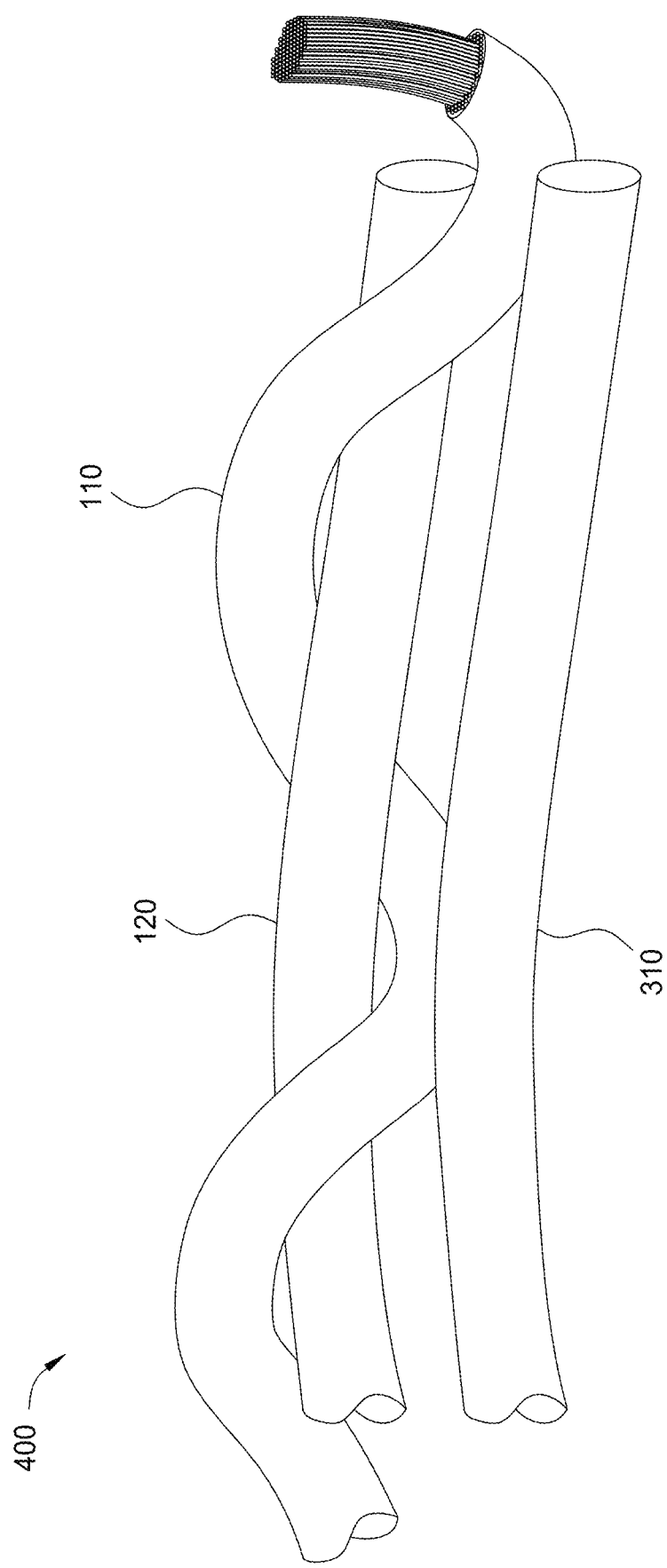
FIG. 4 is an enlarged partial perspective view of a multicomponent stranded yarn including a continuous ceramic strand wrapped around a continuous load-relieving process aid strand and a metal alloy wire according to implementations described herein.

FIG. 4 is an enlarged partial perspective view of another multicomponent stranded yarn 400 including the continuous ceramic strand 110 served around the continuous load-relieving process aid strand 120 and the metal wire 310 according to implementations described herein. As depicted in FIG. 4, the multicomponent stranded yarn 400 is a tri-component stranded yarn. The continuous load-relieving process aid strand 120 is a polymeric monofilament as described herein. The continuous ceramic strand 110 served around the continuous load-relieving process aid strand 120 are both drawn into the knitting system through a single material feeder and "plated" together with the metal wire 310 which is drawn into the system through a second material feeder to create the desired knit fabric.

Figure 5:
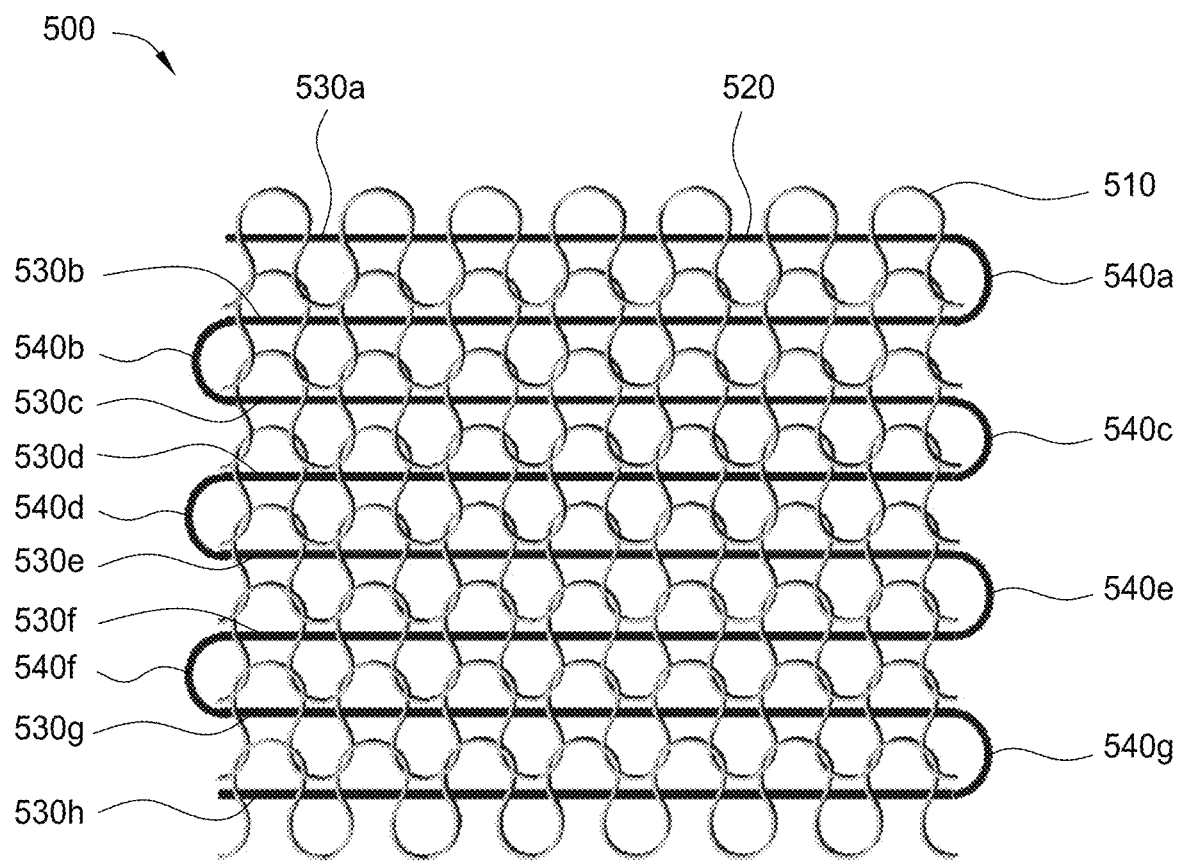
FIG. 5 is an enlarged perspective view of one example of a knit fabric that includes a multicomponent yarn and a fabric integrated inlay according to implementations described herein.

FIG. 5 is an enlarged perspective view of one example of a multicomponent yarn 510 in a knit fabric 500 that includes a wire inlay 520 integrated with the knit fabric 500 according to implementations described herein. The wire inlay 520 depicted in FIG. 5 is aligned with the knit direction of the knit fabric 500. The wire inlay 520 is periodically integrated with the knit fabric 500 to provide additional stiffness and strength to the knit fabric 500. In some implementations, the wire inlay 520 is interwoven with the knit fabric 500. The knit fabric 500 is a weft knitted structure with a horizontal row of loops made by knitting the multicomponent yarn 510 in a horizontal direction (i.e., the knit direction). The wire inlay 520 is a continuous inlay including straight wire segments 530a-530h with alternating curved wire segments 540a-540g connecting each straight wire segment to an adjacent straight wire segment (for example, straight wire segment 530a and straight wire segment 530b are connected by curved wire segment 540a). Each straight wire segment 530a-530h of the wire inlay 520 is aligned parallel to the knit direction of the multicomponent yarn 510.

The wire inlay 520 may have variable spacing to account for regions that require more or less stiffness. For example, wire inlay 520 may have uniform or non-uniform spacing between adjacent straight wire segments. In the implementation depicted in FIG. 5, the wire inlay 520 has uniform spacing between the adjacent straight wire segments of the wire inlay 520. One or multiple feeds of wire inlays can be used to create the desired architecture of the final component.

Figure 6:
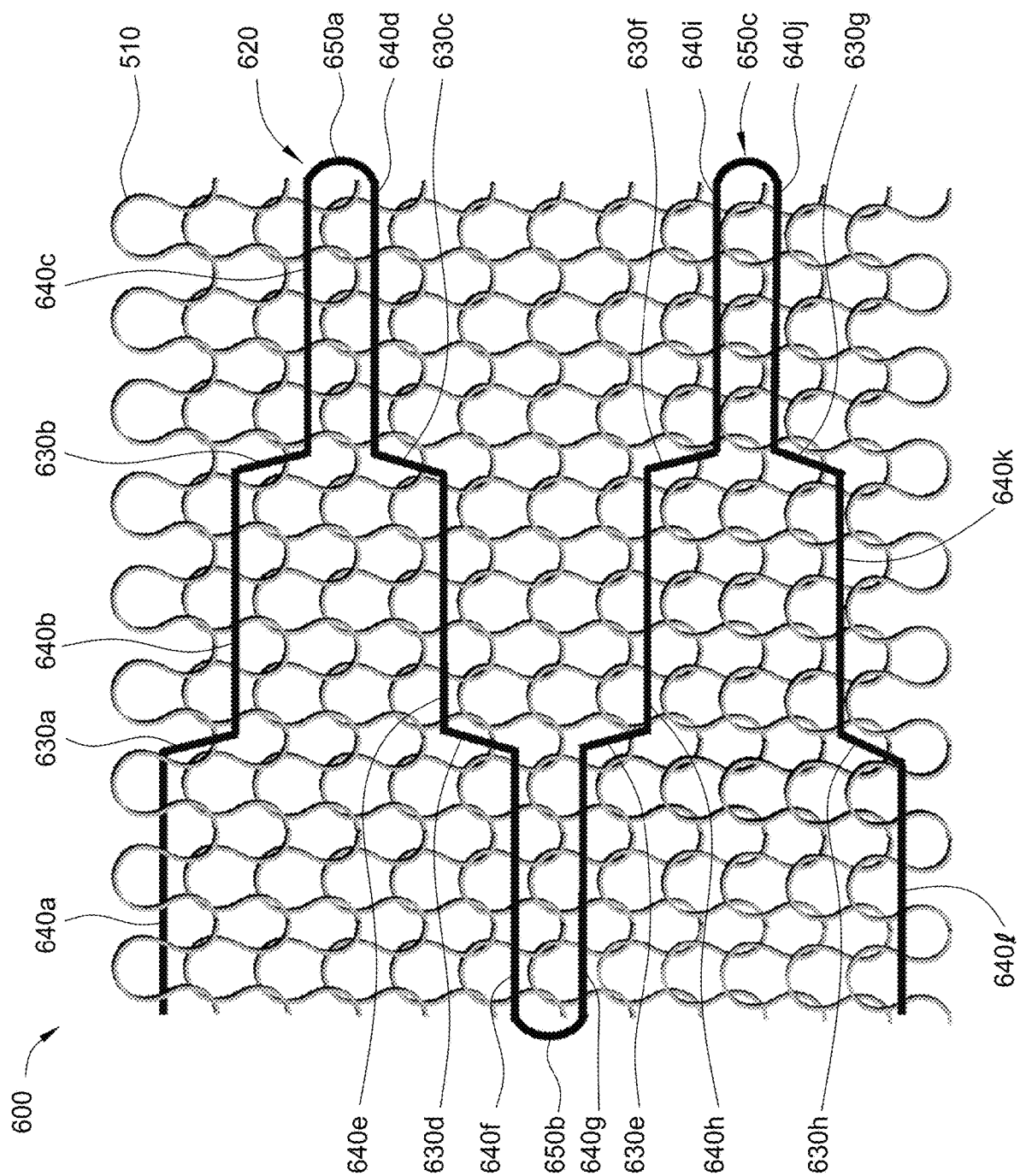
FIG. 6 is an enlarged perspective view of yet another example of a knit fabric that includes a multicomponent yarn and a fabric integrated inlay according to implementations described herein.

FIG. 6 is an enlarged perspective view of yet another example of a knit fabric 600 that includes a multicomponent yarn 510 and a wire inlay 620 integrated with the knit fabric 600. The knit fabric 600 is a weft-knitted structure with a horizontal row of loops made by knitting the multicomponent yarn 510 in a horizontal direction (i.e., the knit direction). The knit fabric 600 is similar to knit fabric 500 depicted in FIG. 5 except that the wire inlay 620 includes straight wire segments 630a-630h that are angled relative to the knit direction of the knit fabric 600, straight wire segments 640a-640l that are aligned with the knit direction of the knit fabric 600, and curved wire segments 650a-650c.

The wire inlay 620 is a continuous inlay including straight wire segments 640c and 640d aligned with the knit direction, straight wire segments 640f and 640g aligned with the knit direction, and straight wire segments 640i and 640j aligned with the knit direction with alternating curved wire segments 650a, 650b and 650c connecting each straight wire segment to an adjacent straight wire segment (i.e., straight wire segment 640c and straight wire segment 640d are connected by curved wire segment 650a). Each straight wire segment 640c, 640d, 640f, 640g, 640i and 640j of the wire inlay 620 is aligned parallel to the knit direction of the multicomponent yarn 510.

The wire inlay 620 further includes angled straight wire segment 630a, which connects aligned straight wire segments 640*a* and 640*b*, angled straight wire segment 630*b*, which connects aligned straight wire segments 640*b* and 640*c*, angled straight wire segment 630*c*, which connects aligned straight wire segments 640*d* and 640*e*, angled straight wire segment 630*d*, which connects aligned straight wire segments 640*e* and 640*f*, angled straight wire segment 630*e*, which connects aligned straight wire segments 640*g* and 640*h*, angled straight wire segment 630*f*, which connects aligned straight wire segments 640*k* and 640*l*, angled straight wire segment 630*g*, which connects aligned straight wire segments 640*j* and 640*k*, and angled straight wire segment 630*h*, which connects aligned straight wire segments 640*k* and 640*l*.

As discussed herein, the wire inlay 620 may have variable spacing, uniform spacing, or both to account for regions which require more or less stiffness. As depicted in FIG. 6, the wire inlay 620 may have variable spacing to account for regions which require more or less stiffness. For example, the spacing between each pair of parallel aligned straight wire segments, for example, 640*c* and 640*d*, 640*b* and 640*e*, 640*a* and 640*f*, increases as each pair of parallel aligned straight wire segment moves away from each curved wire segment 650*a*-650*c*. One or multiple feeds of the wire inlay 620 can be used to create the desired architecture of the final product.

Figure 7:
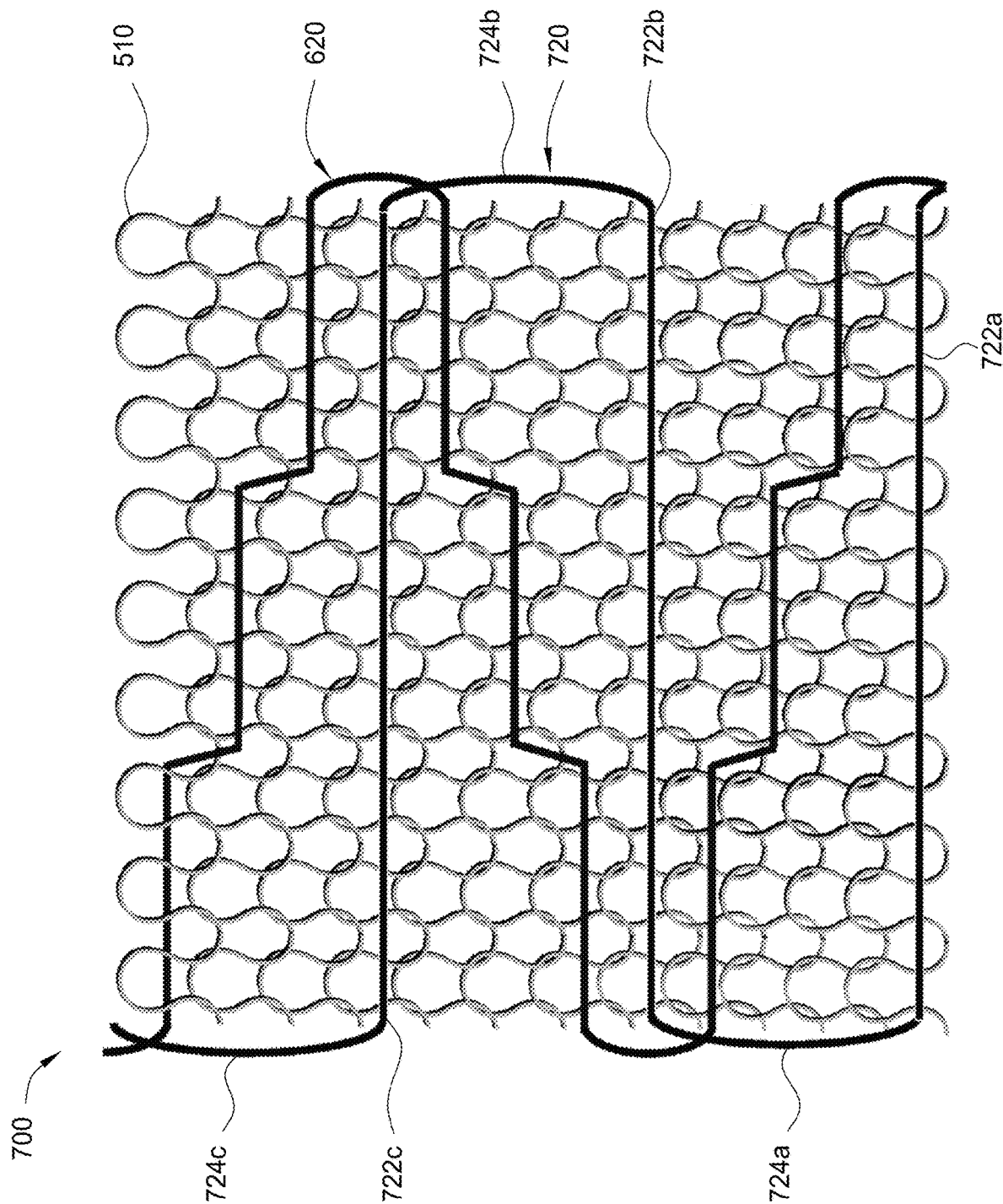
FIG. 7 is an enlarged perspective view of yet another example of a knit fabric that includes a multicomponent yarn and multiple fabric integrated inlays according to implementations described herein.

FIG. 7 is an enlarged perspective view of yet another example of a knit fabric 700 that includes a multicomponent yarn 510 and multiple overlapping wire inlays 620, 720 integrated with the knit fabric 700 according to implementations described herein. The knit fabric 700 is a weft-knitted structure with a horizontal row of loops made by knitting the multicomponent yarn 510 in a horizontal direction (i.e., the knit direction). The knit fabric 700 is similar to knit fabrics 500 and 600 depicted in FIG. 5 and FIG. 6 except that the knit fabric 700 includes overlapping wire inlays 720 and 620. Wire inlay 620 and 720 have segments aligned with the knit direction of the knit fabric 700.

The wire inlay 720 is a continuous inlay including straight wire segments 722*a*-722*c* with alternating curved wire segments 724*a* and 724*b* connecting each straight wire segment to an adjacent straight wire segment (i.e., straight wire segment 722*a* and straight wire segment 722*b* are connected by curved wire segment 724*a*). Each straight wire segment 722*a*-722*c* of the wire inlay 720 is aligned parallel to the knit direction of the multicomponent yarn 510. The spacing between adjacent straight wire segments of the wire inlay 720 is depicted as uniform. However, in some implementations, spacing between adjacent wire segments of the wire inlay 720 may be variable to account for regions that require more or less stiffness.

The wire inlays 520, 620 and 720 may be composed of any of the aforementioned metal or ceramic materials. The wire inlays 520, 620 and 720 typically comprise a larger diameter material (e.g., from about 300 micrometers to about 3,000 micrometers) that either cannot be knit or is difficult to knit due to the diameter of the wire inlay and the gauge of the knitting machine. However, it should be understood that the diameter of the material that can be knit is dependent upon the gauge of the knitting machine and as a result, different knitting machines can knit materials of different diameters. The wire inlays 520, 620 and 720 may be placed in the knit fabric 500, 600, 700 by laying the wire inlays 520, 620 and 720 in between adjacent stitches for an interwoven effect.

The multicomponent yarn 510 may be any of the multicomponent yarns depicted in FIGS. 1-4. Although FIGS. 5-7 depict a jersey knit fabric zone, it should be noted that the depiction of a jersey knit fabric zone is only exemplary and that the implementations described herein are not limited to jersey knit fabrics. Any suitable knit stitch and density of stitch can be used to construct the knit fabrics described herein. For example, any combination of knit stitches, e.g., jersey, interlock, rib-forming stitches, or otherwise may be used.

Although FIGS. 5-7 depict a weft-knitted structure, it should be understood that the implementations described herein may be used with other knit structures including, for example, warp-knitted structures. In a warp-knitted fabric, where the knit direction is vertical, the wire inlays may be positioned normal to the knit direction. It should also be understood that the wire inlay designs depicted in FIGS. 5-7 are only examples, and that other wire inlay designs may be used with the implementations disclosed herein. For example, in some implementations where segments of the wire inlay are angled relative to the knit direction, the angled wire segments of the inlay may be positioned at a 2 degree to 60 degree angle relative to the knit direction (e.g., at a 5 degree to 30 degree angle relative to the knit direction; at a 9 degree to 20 degree angle relative to the knit direction).

Figure 8:
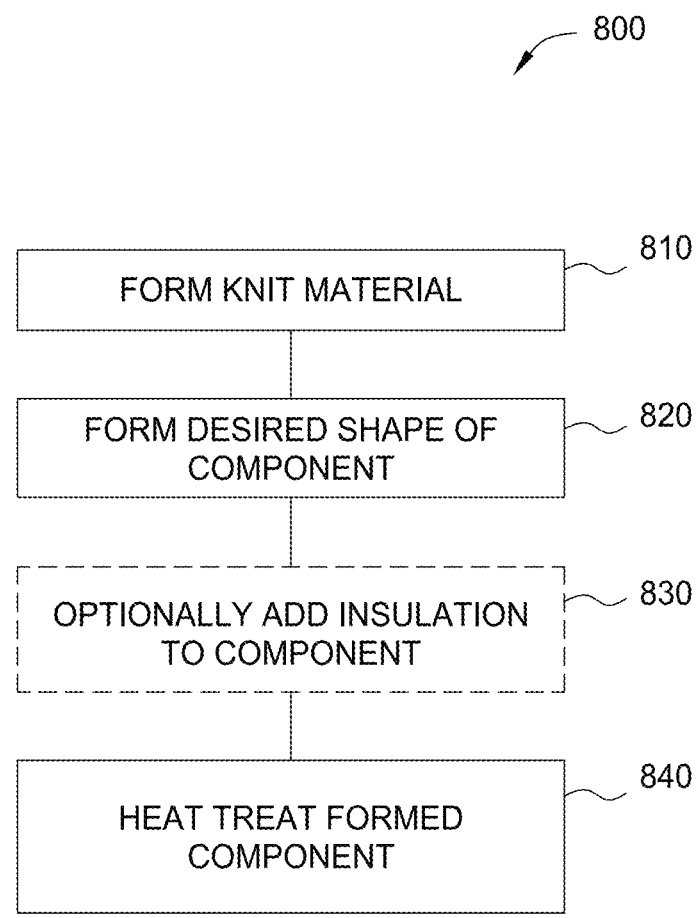
FIG. 8 is a process flow diagram for forming a thermal sealing member according to implementations described herein.

FIG. 8 is a process flow diagram 800 for forming a thermal sealing member according to implementations described herein. At block 810, the knit fabric is formed. In some implementations, a continuous ceramic strand and a continuous load-relieving process aid strand are concurrently knit to form a knit fabric. The continuous ceramic strand and the continuous load-relieving process aid strand may be as previously described above. The strands may be concurrently knit on a flat-knitting machine, a tubular-knitting machine, or any other suitable knitting machine. The continuous ceramic strand and the continuous load-relieving strand may be simultaneously fed into a knitting machine through a single material feeder to form a multicomponent yarn. In implementations where the continuous ceramic strand is wrapped around the continuous load-relieving process aid strand (e.g., as depicted in FIG. 2 and FIG. 4), the continuous ceramic strand may be wrapped around the continuous process aid strand prior to simultaneously feeding the continuous ceramic strand and the continuous load-relieving process aid strand into the knitting machine. A serving machine/overwrapping machine may be used to wrap the ceramic fiber strand around the continuous load-relieving process aid strand. Although knitting may be performed by hand, the commercial manufacture of knit components is generally performed by knitting machines. Any suitable knitting machine may be used. The knitting machine may be a single double-flatbed knitting machine.

In some implementations where the multicomponent stranded yarn further comprises a metal alloy wire the bi-component yarn may be fed through a first material feeder and the metal alloy wire may be simultaneously fed through a second material feeder to form the knit fabric. The strands may be concurrently knit to form a single-layer. The metal alloy wire may be knit in a soft-tempered state that is later hardened by a heat hardening process.

In some implementations, a wire inlay is added to the knit fabric. The wire inlay may be any of the aforementioned metal or ceramic materials. In implementations that contain both a metal alloy wire that is co-knit and a wire inlay, the wire inlay has a larger diameter than the metal alloy wire. The wire inlay typically comprises a larger diameter material (e.g., from about 300 micrometers to about 3,000 micrometers; from about 400 micrometers to about 700 micrometers) that either cannot be knit or is difficult to knit due to the diameter of the wire inlay and the gauge of the knitting machine. However, it should be understood that the diameter of the material that can be knit is dependent upon the gauge of the knitting machine and as a result, different knitting machines can knit materials of different diameters. The wire inlay may be placed in the knit fabric by laying the wire inlay in between opposing stitches for an interwoven effect.

In some implementations where a tubular-knitting technique is used, one or more alloy wires can be floated across opposing needle beds, which can provide additional stiffness and support after the seal is expanded to shape and heat hardened.

At block 820, the knit fabric is formed into the desired shape of the final component. The desired shape is typically formed while the metal alloy wire and fabric integrated inlay are in a soft formable state. The knit fabric can be laid up into a preform or fit on a mandrel to form the desired shape of the final component.

At block 830, the insulation material is optionally added to the interior of the formed component. Any insulation material capable of withstanding desired temperatures may be used. Exemplary insulation materials include fiberglass and ceramics. Alternatively, other widely available high temperature materials such as zirconia, alumina, aluminum silicate, aluminum oxide, and high temperature glass fibers may be employed. In some implementations, the insulation material is stitched to the knit fabric. The insulation material may be added at any time during formation of the component. For example, the insulation material may be added prior to shaping the knit fabric into the component or after the knit fabric is shaped into the final component. In some implementations, where the knit fabric is formed using a tubular-knitting process, the insulation may be inserted into the tube during knit fabrication.

In some implementations, the knit fabric is stitched together to form the final component. The knit fabric is typically stitched together to form the final component while the metal alloy wire and the wire inlay are in a soft formable state. However, in some implementations, the knit fabric may be stitched together after the metal alloy wire and the wire inlay are hardened.

At block 840, the formed component is heat treated. In implementations where no metal alloy is present in the knit fabric, the ceramic-based fiber may be heat cleaned and heat treated to the manufacturer's specifications. This heat treatment process removes any sizing on the fiber, as well as removing the process aid fiber. In implementations where the metal alloy is present, the metal is heat hardened to standard specifications. The heat hardening cycle also serves to remove the sizing on the ceramic-based fiber as well as the processing aid. In implementations where the process aid is a sacrificial process aid, the knit fabric is exposed to a process aid removal process. Depending upon the material of the process aid, the process aid removal process may involve exposing the knit fabric to solvents, heat and/or light. In some implementations where the process aid is removed via exposure to heat (e.g., heat fugitive), the knit fabric may be heated to a first temperature to remove the load-relieving process aid. It should be understood that the temperatures used for process aid removal process are material dependent.

In some implementations, the knit fabric is exposed to a strengthening heat treatment process. The knit fabric may be heated to a second temperature greater than the first temperature to anneal the ceramic strand. Annealing the ceramic strand may relax the residual stresses of the ceramic strand allowing for higher applied stresses before failure of the ceramic fibers. Elevating the temperature above the first temperature of the heat clean may be used to strengthen the ceramic and also simultaneously strengthen the metal wire if present. After elevating the temperature above the first temperature, the temperature may then be reduced and held at various temperatures for a period of time in a step down tempering process. It should be understood that the temperatures used for the strengthening heat treatment process are material dependent.

In one exemplary implementation where the process aid is Nylon 6,6, the ceramic strand is Nextel™ 312, and the metal alloy wire is Inconel® 718, after knitting, the knit fabric is exposed to a heat treatment process to heat clean/burn off the Nylon 6,6 process aid. Once the Nylon 6,6 process aid is removed, a strengthening heat treatment that both Inconel® 718 and Nextel™ 312 can withstand is performed. For example, while heating the material to 1,000 degrees Celsius the Nylon 6,6 process aid burns off at a first temperature less than 1,000 degrees Celsius. The temperature is reduced from 1,000 degrees Celsius to about 700 to 800 degrees Celsius where the temperature is maintained for a period of time and down to 600 degrees Celsius for a period of time. Thus simultaneously annealing the Nextel™ 312 ceramic while grain growth and recrystallization of the Inconel® 718 wire occurs. Thus, simultaneous strengthening of the metal wire and subsequent heat treatment of the ceramic are achieved.

The knit fabric may be impregnated with a selected settable impregnate which is then set. The knit fabric may be laid up into a preform or fit into a mandrel prior to impregnation with the selected settable impregnate. Suitable settable impregnates include any settable impregnate that is compatible with the knit fabric. Exemplary suitable settable impregnates include organic or inorganic plastics and other settable moldable substances, including glass, organic polymers, natural and synthetic rubbers and resins. The knit fabric may be infused with the settable impregnate using any suitable liquid-molding process known in the art. The infused knit fabric may then be cured with the application of heat and/or pressure to harden the knit fabric into the final molded product.

One or more filler materials may also be incorporated into the knit fabric depending upon the desired properties of the final knit product. The one or more filler materials may be fluid resistant. The one or more filler materials may be heat resistant. Exemplary filler material include common filler particles such as carbon black, mica, clays such as e.g., montmorillonite clays, silicates, glass fiber, carbon fiber, and the like, and combinations thereof.

In addition to the continuous ceramic strand, the knit fabric may further comprise a second fiber component. The second fiber component may be selected from the group consisting of: ceramics, glass, minerals, thermoset polymers, thermoplastic polymers, elastomers, metal alloys, and combinations thereof. The continuous ceramic strand and the second fiber component can comprise the same or different knit stitches. The continuous ceramic strand and the second fiber component may be concurrently knit in a single-layer. The continuous ceramic strand and the second fiber can comprise the same knit stitches or different knit stitches. The continuous ceramic strand and the second fiber may be knit as integrated separate regions of the final knit product. Knitting as integrated separate regions may reduce the need for cutting and sewing to change the characteristics of that region. The knit integrated regions may have continuous fiber interfaces, whereas the cut and sewn interfaces do not have continuous interfaces making integration of the previous functionalities difficult to implement (e.g., electrical conductivity). The continuous ceramic strand and the second fiber component may each be inlaid in warp and/or weft directions.

The knit fabrics described herein may be knit into multiple layers. Knitting the knit fabrics described herein into multiple layers allows for combination with fabrics having different properties (e.g., structural, thermal or electric) while maintaining peripheral connectivity or registration within/between the layers of the overall fabric. The multiple layers may have intermittent stitch or inlaid connectivity between the layers. This intermittent stitch or inlaid connectivity between the layers may allow for the tailoring of functional properties/connectivity over shorter length scales (e.g., <0.25"). For example, with two knit outer layers with an interconnecting layer between the two outer layers. The multiple layers may contain pockets or channels. The pockets or channels may contain electrical wiring, sensors or other electrical functionality. The pockets or channels may contain one or more filler materials.

The one or more filler materials may be selected to enhance the desired properties of the final knit product. The one or more filler materials may be fluid resistant. The one or more filler materials may be heat resistant. Exemplary filler material include common filler particles such as carbon black, mica, clays such as e.g., montmorillonite clays, silicates, glass fiber, carbon fiber, and the like, and combinations thereof.

Figure 9:
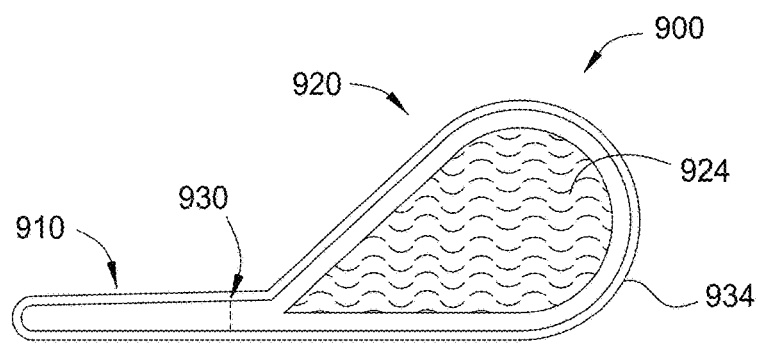
FIG. 9 is a schematic cross-sectional view of an exemplary thermal sealing member according to implementations described herein.

FIG. 9 is a schematic cross-sectional view of an exemplary thermal sealing member 900 according to implementations described herein. The thermal sealing member 900 is a p-type bulb seal formed from tab portion 910 that is coupled to a bulb portion 920. In some implementations, both the tab portion 910 and the bulb portion 920 are made from the knit fabric described herein. In some implementations, the bulb portion 920 is further filled with insulating material 924 (e.g., fiberglass, ceramic, etc.). Of course, it should be noted that in some implementations, not only the bulb portion 920 but also the tab portion 910 is at least partially filled with a thermally insulating material. In some implementations, the tab portion 910 is sewn (here, via stitching 930) or otherwise coupled to the bulb portion 920 to complete a pliable (typically manually deformable) seal. In some implementations, one or more additional external layers 934 may be added to the thermal sealing member 900 for a variety of purposes, for example, increased durability, increased heat resistance, or both.

While the exemplary bulb seal of FIG. 9 is drawn with certain proportions, it should be appreciated that numerous modifications are also contemplated. For example, and with further reference to the cross sectional view of the bulb seal in FIG. 9, the tab portion may extend significantly further to the left to have a width that is up to 2-fold, up to 5-fold, and even up to 10-fold (or even more) than the width of the bulb portion. Similarly, the bulb portion may extend significantly further to the right to have a width that is up to 2-fold, up to 5-fold, and even up to 10-fold (or even more) than the width of the tab portion. Moreover, it should be noted that in some implementations, additional (e.g., second, third, fourth, etc.) tab portions are provided to the bulb portion, wherein the additional tab portions may extend into the same direction or in opposite directions. Likewise, where desirable, one or more bulb portions may be coupled to the tab portion(s), especially where the end surface is relatively large. Therefore, it should be recognized that in some implementations, the bulb seal includes multiple bulb portions that are most preferably formed from a single sheet (e.g., a double bulb seal). In such alternative structures, the bulb portions are preferably sequentially arranged, but may (alternatively or additionally) also be stacked. Thus, seals are also contemplated in which at least one of the bulbs is filled with a different insulating material than the remaining bulbs (e.g., to accommodate to different heat exposure).

Figure 10A:
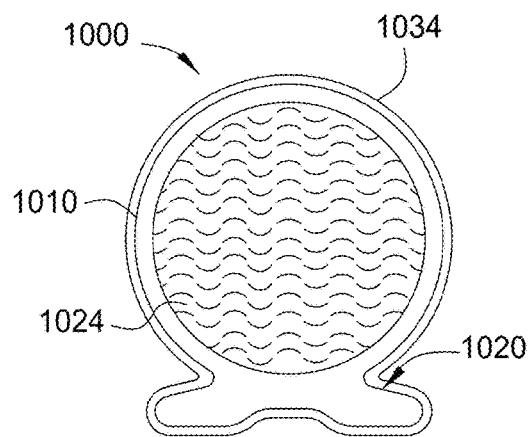
FIGS. 10A-10B are schematic cross-sectional views of another thermal sealing member according to implementations described herein.
Figure 10B:
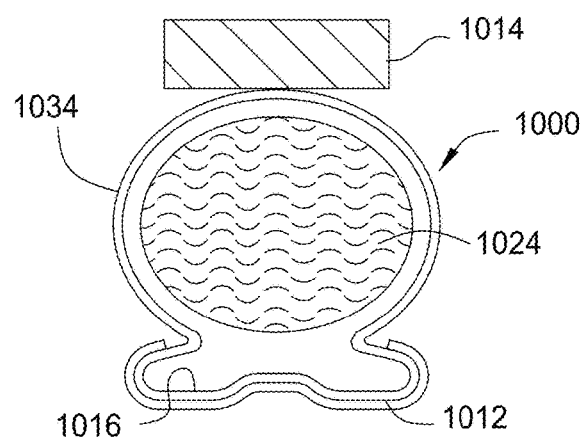

FIGS. 10A-10B are schematic cross-sectional views of another thermal sealing member 1000 according to implementations described herein. The thermal sealing member 1000 is an omega-type bulb seal formed from a bulb portion 1010 and a split base 1020. In some implementations, both the bulb portion 1010 and the split base 1020 are made from the knit fabric described herein. The outer configuration of the split base 1020 defines a seat that fits within and mates with a channel 1016 to provide firm mechanical seating and support. Although such channels are widely used for mounting bulb seals, these channels are not required for seal structures in accordance with the implementations described herein because a wide range of other expedients for mounting or positioning the seal structure can be used. In some implementations, the bulb portion 1010 is further filled with insulating material 1024 (e.g., fiberglass, ceramic, etc.). In some implementations, one or more additional external layers 1034 may be added to the thermal sealing member 1000 for a variety of purposes, for example, increased durability, increased heat resistance, or both.

FIG. 10B is a cross-sectional view of the thermal sealing member 1000 mounted between opposing surfaces. In FIG. 10B, the thermal sealing member 1000 is mounted between a firewall 1012 which may be assumed for this example to be the forward part of an aircraft body, and an opposing member 1014 which in this instance is a portion of an engine nacelle facing and spaced apart from the firewall 1012. The firewall 1012 includes the recessed channel 1016 for receiving the split base 1020 of the thermal sealing member 1000. The thermal sealing member 1000 is seated within and positioned relative to the recessed channel 1016 and the opposing member 1014.

Figure 11A:
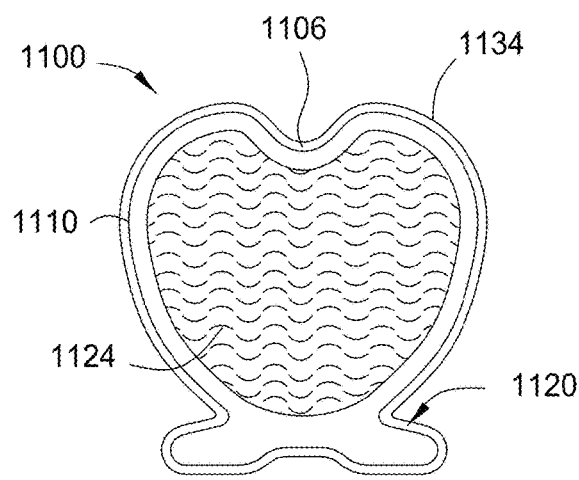
FIGS. 11A-11B are schematic cross-sectional views of another thermal sealing member according to implementations described herein.
Figure 11B:
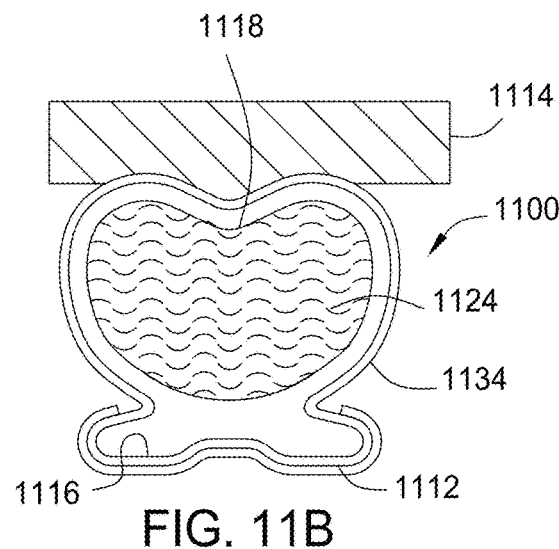

FIG. 11A-11B are schematic cross-sectional views of another thermal sealing member 1100 according to implementations described herein. The thermal sealing member 1100 is an M-type or heart shaped type bulb seal formed from a bulb portion 1110 and a split base 1120. The bulb portion 1110 has a concave portion 1106 for mating with an opposing convex surface. In some implementations, both the bulb portion 1110 and the split base 1120 are made from the knit fabric described herein. The outer configuration of the split base 1120 defines a seat that fits within and mates with a channel 1116 to provide firm mechanical seating and support. Although such channels are widely used for mounting bulb seals, these channels are not required for seal structures in accordance with the implementations described herein because a wide range of other expedients for mounting or positioning the seal structure can be used. In some implementations, the bulb portion 1110 is further filled with insulating material 1124 (e.g., fiberglass, ceramic, etc.). In some implementations, one or more additional external layers 1134 may be added to the thermal sealing member 1100 for a variety of purposes, for example, increased durability, increased heat resistance, or both.

FIG. 11B is a cross-sectional view of the thermal sealing member 1100 mounted between opposing surfaces. In FIG. 11B, the thermal sealing member 1100 is mounted between a firewall 1112 which may be assumed for this example to be the forward part of an aircraft body, and an opposing member 1114 which in this instance is a portion of an engine nacelle facing and spaced apart from the firewall 1112. The firewall 1112 includes the recessed channel 1116 for receiving the split base 1120 of the thermal sealing member 1100 while the opposing member 1114 incorporates a convex groove 1118 opposite to and paralleling the channel 1116 for mating with the concave portion 1106 of the thermal sealing member 1100. The thermal sealing member 1100 is seated within and positioned relative to the recessed channel 1116 and the opposing member 1114.

It should be understood that the implementations described herein are not limited to the seal geometries depicted in FIGS. 9-11. In addition to the seal geometries depicted in FIGS. 9-11, the seals can be curvilinear or discrete and can also incorporate other geometric features such as holes, additional flanges, or overlapping flaps for attachment to other structures, for insulation enclosure, or both. Furthermore, one or more additional external layers may be added to the seal designs described herein for a variety of purposes, for example, increased durability, increased heat resistance, or both.

Fabrication and qualification tests performed on samples based on the implementations described herein demonstrated increased performance over current baselines, including compression set, abrasion, and fire/flame tests on integrated Nextel™ 312 ceramic fiber and Inconel® alloy 718 and p-type bulb seal samples. Multilayer current state of the art thermal barrier seals were compared with the integrated knit ceramic (Nextel™ 312) and metal alloy (Inconel® alloy 718) seals formed according to implementations described herein. The integrated knit ceramic seals employed a co-knit Nextel™ 312 and small diameter Inconel® alloy 718 wire along with a larger diameter Inconel® alloy 718 wire inlay.

Compression set testing was performed at 800 degrees Fahrenheit for 220 hours while compressed to 30%. All samples had less than 1% height deflection post-test. Compression set testing was also performed at 1,000 degrees Fahrenheit for 168 hours while compressed to 30%. In this high temperature compression test, all samples had less than 5% compression set post-test. Under the same compression set testing conditions, the current state of the art thermal barrier seal became plastically compressed with greater than 10% compression set which resulted in gaps and ultimately failure as a thermal and flame barrier. No failures occurred during initial abrasion testing with 5,000 cycles at 30% compression. A nacelle vibration profile was run on samples of the hybrid thermal barrier seals described herein. The hybrid thermal barrier seals survived the complete 5 hour nacelle vibration profile when compressed to 30% and held in contact with titanium and stainless steel wear plates. The same profile, compression and wear interfaces were run on the current state of the art thermal barrier seals with failures occurring 3 hours into the run. The backside of the seal remained intact under 200 degrees Fahrenheit when a 3,000 degrees Fahrenheit torch was applied to the front at a one inch offset from the seal for a period of five minutes. No failures occurred under fire testing with a flame at 2,000 degrees Fahrenheit for a period of 15 minutes. Furthermore, no flame penetration was observed during testing and no backside burning occurred when the flame was shut off after a period of 15 minutes.

To understand the effect of inlay wires on the seal compression behavior, load versus deflection tests were performed on different inlay architectures (i.e. no inlay/coil, aligned-only inlay, angled-only inlay, and aligned and angled inlay) with variable inlay spacing. The results of this study showed that the angled inlays act more like a truss structure, which leads to increases stiffness in seals under compression, while aligned inlays tend to buckle or shift under compression. This study demonstrated that an angled inlay with 0.5" spacing had better compression resistance than the aligned and angled inlay which has more coils per inch but less angled inlay. Therefore, optimized architectures can lead to simpler inlay designs that take less time to fabricate, lead to less fiber breakage and have lower weight.

It should be noted that the products constructed with the implementations described herein are suitable for use in a variety of applications, regardless of the sizes and lengths required. For example, the implementations described herein could be used in automotive, marine, industrial, aeronautical or aerospace applications, or any other application wherein knit products are desired to protect nearby components from exposure to volatile fluids and thermal conditions.

While the foregoing is directed to implementations of the present disclosure, other and further implementations of the disclosure may be devised without departing from the basic scope thereof, and the scope thereof is determined by the claims that follow.

What is claimed is:

1. A method of forming a thermal sealing member, comprising:
   simultaneously feeding a continuous ceramic strand and a continuous load-relieving process aid strand through a single material feeder and a first metal alloy wire through a second material feeder;
   concurrently knitting the continuous ceramic strand, the continuous load-relieving process aid strand and the first metal alloy wire to form a single-layer ceramic-based knit fabric, wherein the first metal alloy wire is in a soft-tempered state; and
   forming the single-layer ceramic-based knit fabric into the shape of the thermal sealing member.

2. The method of claim 1, further comprising interweaving a second metal alloy wire into the single-layer ceramic-based knit fabric.

3. The method of claim 2, wherein a diameter of the second metal alloy wire is greater than a diameter of the first metal alloy wire.

4. The method of claim 2, wherein the second metal alloy wire is aligned parallel with a knit direction of the single-layer ceramic-based knit fabric.

5. The method of claim 2, wherein the second metal alloy wire is angled relative to a knit direction of the single-layer ceramic-based knit fabric.

6. The method of claim 1, further comprising adding insulation material to an interior of the shaped thermal sealing member.

7. The method of claim 1, wherein concurrently knitting is performed using either a flat-knitting process or a tubular-knitting process.

8. The method of claim 7, wherein the knitting is performed using a tubular-knitting process.

9. The method of claim 1, wherein the single-layer ceramic-based knit fabric is formed using a weft-knitting process or a warp-knitting process.

10. The method of claim 1, further comprising heat treating the formed thermal sealing member to harden the first metal alloy wire.

11. A method of forming a thermal sealing member, comprising:
    simultaneously feeding a continuous ceramic strand and a continuous load-relieving process aid strand through a single material feeder and a first metal alloy wire through a second material feeder to form a multi-component yarn;

knitting the multi-component yarn to form a single-layer ceramic-based knit fabric, wherein the first metal alloy wire is in a soft-tempered state; and forming the single-layer ceramic-based knit fabric into the shape of the thermal sealing member.

12. The method of claim 11, further comprising interweaving a second metal alloy wire into the single-layer ceramic-based knit fabric.

13. The method of claim 12, wherein a diameter of the second metal alloy wire is greater than a diameter of the first metal alloy wire.

14. The method of claim 12, wherein the second metal alloy wire is aligned parallel with a knit direction of the single-layer ceramic-based knit fabric.

15. The method of claim 12, wherein the second metal alloy wire is angled relative to a knit direction of the single-layer ceramic-based knit fabric.

16. The method of claim 11, further comprising adding insulation material to an interior of the shaped thermal sealing member.

17. The method of claim 11, wherein concurrently knitting is performed using either a flat-knitting process or a tubular-knitting process.

18. The method of claim 17, wherein the knitting is performed using a tubular-knitting process.

19. The method of claim 11, wherein the single-layer ceramic-based knit fabric is formed using a weft-knitting process or a warp-knitting process.

20. The method of claim 11, further comprising heat treating the formed thermal sealing member to harden the first metal alloy wire.

\* \* \* \* \*